United States Patent
Snyder

(10) Patent No.: US 9,525,290 B2
(45) Date of Patent: Dec. 20, 2016

(54) BYPASSABLE BATTERY MODULES

(71) Applicant: SAFT S.A., Bagnolet (FR)

(72) Inventor: James G. Snyder, Hanover, PA (US)

(73) Assignee: SAFT, Bagnolet (FR)

( * ) Notice: Subject to any disclaimer, the term of this patent is extended or adjusted under 35 U.S.C. 154(b) by 553 days.

(21) Appl. No.: 14/063,043

(22) Filed: Oct. 25, 2013

(65) Prior Publication Data
US 2015/0115736 A1   Apr. 30, 2015

(51) Int. Cl.
*H02J 1/00* (2006.01)
*H02J 7/00* (2006.01)

(52) U.S. Cl.
CPC ............ *H02J 7/0016* (2013.01); *H02J 7/0021* (2013.01); *H02J 7/0065* (2013.01); *Y02T 10/7055* (2013.01); *Y10T 307/76* (2015.04)

(58) Field of Classification Search
None
See application file for complete search history.

(56) References Cited

U.S. PATENT DOCUMENTS

| | | |
|---|---|---|
| 6,043,628 A | 3/2000 | Perelle et al. |
| 6,265,846 B1 | 7/2001 | Flechsig et al. |
| 2004/0119444 A1 | 6/2004 | Faure et al. |
| 2008/0164818 A1* | 7/2008 | Ichikawa ............ H05B 41/2887 315/77 |
| 2013/0162045 A1 | 6/2013 | Weissenborn et al. |
| 2014/0091772 A1* | 4/2014 | Del Core ............ B60L 11/1875 320/136 |
| 2014/0125284 A1* | 5/2014 | Qahouq ................ H02J 7/0065 320/118 |

FOREIGN PATENT DOCUMENTS

EP   1 018 792 B1   2/2009

* cited by examiner

Primary Examiner — Jared Fureman
Assistant Examiner — Aqeel Bukhari
(74) Attorney, Agent, or Firm — Sughrue Mion, PLLC

(57) ABSTRACT

A battery system may include a plurality of battery modules connected in series. A battery module of the plurality of battery modules may include a cell stack array, a first solid state switch and a second solid state switch arranged in a half bridge configuration and configured to operate in a complementary fashion, and a solid state driver connected to both gates of the first solid state switch and second solid state switch and configured to turn on and off the first solid state switch and the second solid state switch. Further, the cell stack array is configured to be active when the first solid state switch is on and the second solid state switch is off, and configured to be bypassed when the first solid state switch is off and the second solid state switch is on.

19 Claims, 6 Drawing Sheets

BYPASSABLE BATTERY MODULES

BACKGROUND

1. Field

Apparatuses and methods consistent with exemplary embodiments relate to a battery module and a method for controlling a battery module thereof, and more particularly, a battery module system that includes a plurality of battery modules which may each be controlled to switch from an active state to a bypassed state.

2. Description of Related Art

Failure of any one module in batteries consisting of multiple series-connected modules results in the failure of the series string containing the module. Thus, in batteries containing only one series string, the failure of one module will result in the failure of the entire battery. Combinations of one-shot or manual bypasses, fuses, circuit breakers, DC to DC converters, and power conditioners have been used in an attempt to mitigate the complete failure of a series string of battery modules.

For example, one-shot bypasses are used at the cell level for satellite batteries, allowing the permanent removal of any cell from the series string. Another example is the use of manual module bypasses that have been designed to allow reconfiguring of a battery to a lower voltage arrangement by partially disassembling the battery and manually bypassing the failed module. However, one shot bypasses may result in permanent reduction of the battery capability while a manual module bypass is equivalent to an undesirable in-field repair or reconfiguration.

Another issue for high power batteries is that they may have sufficient power to cause failure if a very low resistance load is connected or if a short circuit occurs. The means of protecting high power batteries from such an overload consist of fuses or circuit breakers at the string or battery level. However, these fuses or circuit breakers must be rated for the full battery voltage. Fuses and circuit breakers have undesirable behavior in many mobile systems such as hybrid electric vehicles or aviation, where the unplanned disconnection of the battery power source from the system can cause a loss of critical function such as lighting, steering, braking, or flight control. Further, high voltage fuses are physically large, making it difficult to incorporate them into modules. Such fuses are added at the string or battery level, so they are unable to interrupt the short circuit of a portion of a string, or of an individual module. It is worth also noting that batteries have output voltages that vary over a wide range of values for the state of charge and battery current. Further, such batteries may also use switches but as a standoff voltage of the solid state switching devices increases their maximum switching frequency decreases in part because of the requirement for large filters if such devices are used in DC to DC converters above a few hundred volts. Also, the nominal battery output voltage is fixed by the battery configuration and the battery capacity is fixed by the capacity of the cells in parallel.

Lithium-ion batteries in particular may have dangerously high voltage and are assembled while electrically "live" requiring operators to wear personal protective equipment. The personal protective equipment for high voltage handling limits operator dexterity and adds significant constraints to a battery design. Alternately, batteries are designed with blind-mate power connections to engage electrical connections without manual operations. However, blind mate connectors are expensive and require additional design features, such as physical interlocks to restrict operator access once any connections are engaged. Lithium Iron Phosphate batteries with parallel branches suffer from current imbalance which can lead to uneven wear-out, or in extreme cases, overload of a branch with resistance far from the norm in either direction. Further, uneven current sharing is self-perpetuating in that a string with lower resistance carries more current, thus dissipating more power, thus increasing its temperature, thus further lowering its resistance, which causes higher current, etc.

Further, another consideration is that the balance of States-Of-Charge (SOC) of modules within a series string cannot be varied except by the slow process of balancing cells. Particularly, current is shared between parallel branches of cells, modules, or strings in an array as a result of dV/dQ (open circuit voltage (OCV) versus SOC slope) and the total resistance in the branch. Electrochemical couples, such as Lithium Iron Phosphate, may be very difficult to manage due to large current imbalances between branches resulting from a large region of the OCV/SOC curve with dV/dQ≈0. Further, cell-level balancing is used to change the SOC balance between modules in a series string. However, this process is slow and typically non-regenerative, particularly; all the energy that must be moved is dissipated in a resistance.

Most high power battery systems require a dedicated circuit to precharge load capacitance. This is typically implemented with a current limiting resistor, additional contactors, and an additional fuse. Additionally, such resistive precharge current limiters will fail if load capacitance is increased, for example, during integration of customer systems. Resistive or motor loads that may be present during precharge prevent resistive current limiting and require more expensive switching precharge current limiters.

Also, DC to DC converters and power conditioners are employed in user systems to provide regulated DC power to loads. DC to DC converters are also employed to convert battery voltage to desired output voltage. However, filter components for these DC to DC converters are large, heavy, and expensive due to the low switching frequency.

Further, using some of the above noted examples, it is impossible to increase a battery's voltage by ½ of one cell's voltage, and it is difficult to vary the voltage by less than a full module's voltage. It is also impossible to increase a battery's capacity by less than one cell's capacity and undesirable to use cells of small capacity to tailor the capacity of a large battery.

SUMMARY

Exemplary embodiments may overcome the above disadvantages and other disadvantages not described above. Also, an exemplary embodiment is not required to overcome the disadvantages described above, and an exemplary embodiment may not overcome any of the problems or issues described above.

According to an aspect of an exemplary embodiment, there is provided a battery module including a cell stack array, a first solid state switch and a second solid state switch arranged in a half bridge configuration and configured to operate in a complementary fashion, and a solid state driver connected to both gates of the first solid state switch and second solid state switch and configured to turn on and off the first solid state switch and the second solid state switch. The cell stack array may be configured to be active when the first solid state switch is on and the second solid state switch is off, and configured to be bypassed when the first solid state switch is off and the second solid state switch is on.

The cell stack array may be an energy storage element including a series string of cells, wherein the first solid state switch is a high side field-effect transistor (FET), and the second solid state switch is a low side field-effect transistor (FET), and wherein the solid state driver includes a pulse width modulation controller and gate driver.

The battery module may be communicatively connected to a control module configured to receive a voltage value and a current value of the cell stack array and determine a control signal that is configured to be transmitted to the solid state driver as an enable signal.

The battery module may further include a low side gate drive power supply configured to provide power to a gate driver in response to the battery module being in a base state, wherein the low power supply is configured to have low quiescent current and is powered by the cell stack array, and a high side gate drive power supply configured to provide power to the gate driver in response to the battery module being in a high usage state, wherein the high side gate drive power supply is configured to be powered by at least one of the cell stack array or the positive terminal, wherein the low side gate drive power supply and the high side gate drive power supply are further configured to provide power to the gate driver in response to the battery module being in a variable output state.

The base state may be when the battery module is being bypassed when a usage is at a zero percent duty cycle, wherein the high usage state is when the battery module usage is at a 100 percent duty cycle, and wherein the variable output state is when the battery module is more than zero percent duty cycle and less than 100 percent duty cycle.

The battery module may further include a positive module terminal and a negative module terminal, wherein the cell stack array includes a positive lead and a negative lead, wherein the first solid state switch includes a first gate, a first source, and a first drain, wherein the second solid state switch includes a second gate, a second source, and a second drain, and wherein the first drain is connected to the positive lead, the first source is connected to the second drain, the first source and the second drain are connected to the positive module terminal and solid state driver, the first gate and the second gate are connected to the solid state driver, and the second source is connected to the negative lead, the negative module terminal, and the solid state driver.

The battery module may further include a cell monitoring and balancing module connected to the solid state driver and cell stack array.

The battery module may further include a low side gate drive power supply connected to a gate driver and the cell stack array, and a high side gate drive power supply connected to the gate driver and a power source including at least one of the cell stack array and the positive module terminal, wherein the gate driver is connected to the first gate, the second gate, the first source, and the second source.

The first solid state switch may be a high side field-effect transistor (FET), and wherein the second solid state switch is a low side FET.

The high side FET may include an array of one or more FETs in parallel, and wherein the low side FET may include an array of one or more FETs in parallel.

The solid state driver may include a gate driver and may be communicatively connected to a pulse width modulation controller.

The cell stack array may be an energy storage element including a series string of cells, wherein the energy storage element includes at least one of an electrochemical cell and an electrolytic capacitor cell.

The battery module may further include a fuse connected between the positive lead and the first drain.

According to an aspect of another exemplary embodiment, there is provided a battery system including a plurality of battery modules connected in series, wherein at least one of the plurality of battery modules includes a cell stack array, a first solid state switch and a second solid state switch arranged in a half bridge configuration and configured to operate in a complementary fashion, and a solid state driver connected to both gates of the first solid state switch and second solid state switch and configured to turn on and off the first solid state switch and the second solid state switch. The cell stack array may be configured to be active when the first solid state switch is on and the second solid state switch is off, and configured to be bypassed when the first solid state switch is off and the second solid state switch is on.

At least one of the plurality of battery module may further include a control module configured to receive a voltage value and a current value of the cell stack array and determine a control signal that is configured to be transmitted to the solid state driver as an enable signal.

The battery system may further include a battery management module configured to transmit a battery management signal to the control module in response to received data from the control module, and a pulse width modulation (PWM) control module configured to transmit a PWM control signal in response to received data from at least one of the control module, the battery management module, sensors or transducers of voltage and/or current, and the solid state driver that includes a PWM interface and gate drive.

According to an aspect of another exemplary embodiment, there is provided a method of controlling a plurality of battery modules, the method including controlling a state of a battery module from among the plurality of battery modules, wherein the state is at least one from a group consisting of an activated state and a deactivated state, wherein the activated state is achieved by activating a high side solid state switch and deactivating a low side solid state switch of the battery module, and wherein the deactivated state is achieved by activating the low side solid state switch and deactivating the high side solid state switch of the battery module.

The method may further include receiving a pulse width modulation (PWM) control signal indicating enablement of the active state, receiving a ready signal indicating enablement of the active state, and selectively activating the deactivated battery module from among the plurality of battery modules based on the received PWM control signal and the ready signal.

The method may further include generating a PWM control signal based on at least one of a state of charge (SOC) of a battery module in the plurality of battery modules, desired output voltage of the plurality of battery modules, and desired output current of the plurality of battery modules, wherein the controlling of the battery module is based on the generated PWM control signal and the enable signal.

The method may further include selectively activating the low side solid state switch and selectively deactivating the high side solid state switch in response to a lacking of a PWM control signal or an enable signal, or in response to receiving the PWM control signal or the enable control signal either of which indicate deactivating the activated battery module from among the plurality of battery modules.

Other aspects and advantages of the invention will be apparent from the following description and the appended claims.

DETAILED DESCRIPTION OF EXEMPLARY EMBODIMENTS

Figure 1:
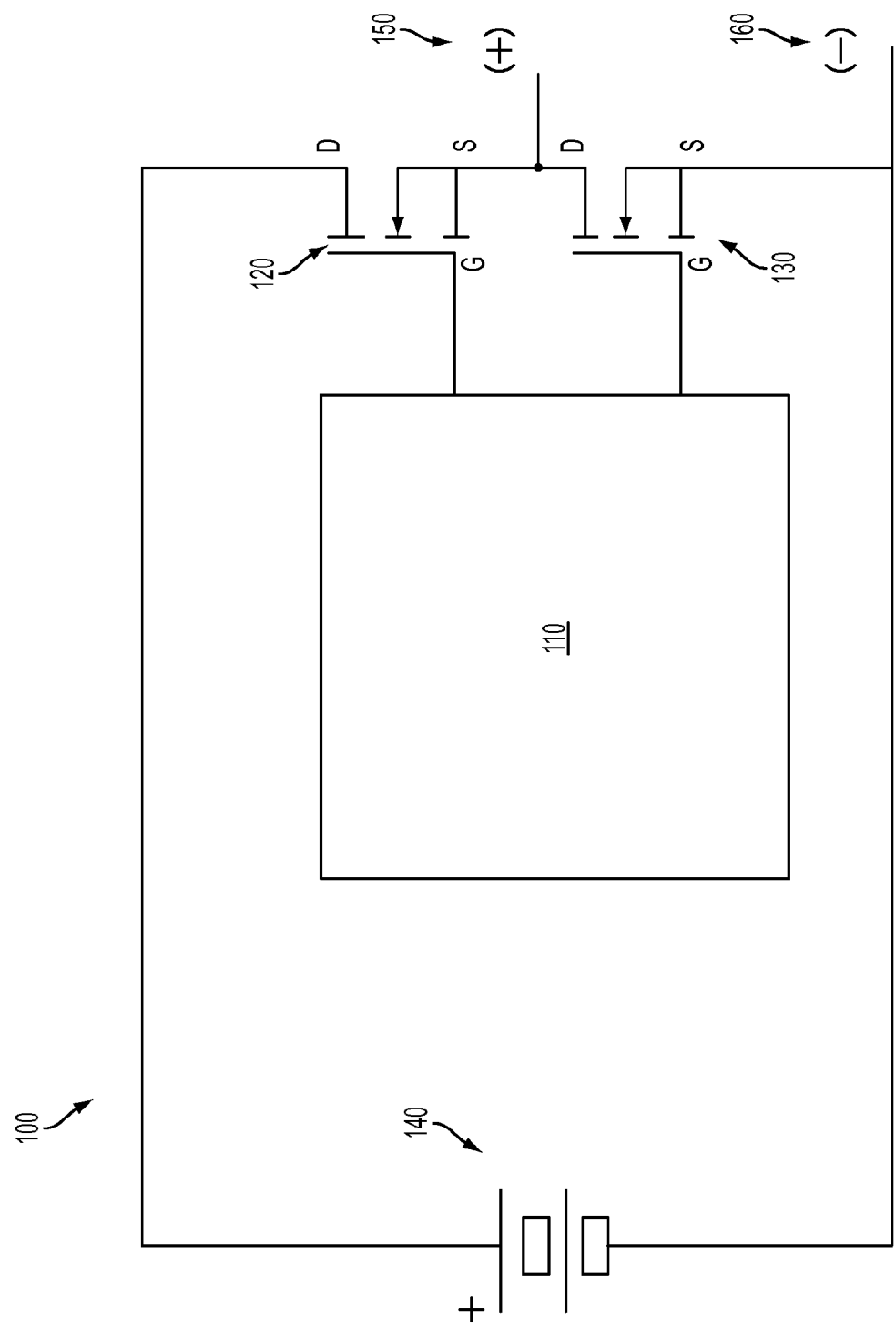
FIG. 1 is a diagram illustrating a battery module in accordance with one or more exemplary embodiments.

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing steps and/or operations described is an example; however, the sequence of and/or operations is not limited to that set forth herein and may be changed as is known in the art, with the exception of steps and/or operations necessarily occurring in a particular order. In addition, respective descriptions of well-known functions and constructions may be omitted for increased clarity and conciseness.

Additionally, exemplary embodiments will now be described more fully hereinafter with reference to the accompanying drawings. The exemplary embodiments may, however, be embodied in many different forms and should not be construed as being limited to the embodiments set forth herein. These embodiments are provided so that this disclosure will be thorough and complete and will fully convey the exemplary embodiments to those of ordinary skill in the art. The scope is defined not by the detailed description but by the appended claims. Like numerals denote like elements throughout.

The term " . . . unit" used in the embodiments indicates a component including software or hardware, such as a Field Programmable Gate Array (FPGA) or an Application-Specific Integrated Circuit (ASIC), and the " . . . unit" performs certain roles. However, the " . . . unit" is not limited to software or hardware. The " . . . unit" may be configured to be included in an addressable storage medium or to reproduce one or more processors. Therefore, for example, the " . . . unit" includes components, such as software components, object-oriented software components, class components, and task components, processes, functions, attributes, procedures, subroutines, segments of program code, drivers, firmware, microcode, circuits, data, a database, data structures, tables, arrays, and variables. A function provided inside components and " . . . units" may be combined into a smaller number of components and " . . . units", or further divided into additional components and " . . . units".

The term "module" as used herein means, but is not limited to, a software or hardware component, such as an FPGA or ASIC, which performs certain tasks. A module may advantageously be configured to reside on an addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

Although the terms used herein are generic terms which are currently widely used and are selected by taking into consideration functions thereof, the meanings of the terms may vary according to the intentions of persons skilled in the art, legal precedents, or the emergence of new technologies. Furthermore, some specific terms may be randomly selected by the applicant, in which case the meanings of the terms may be specifically defined in the description of the exemplary embodiment. Thus, the terms should be defined not by simple appellations thereof but based on the meanings thereof and the context of the description of the exemplary embodiment. As used herein, expressions such as "at least one of," when preceding a list of elements, modify the entire list of elements and do not modify the individual elements of the list.

It will be understood that when the terms "includes," "comprises," "including," and/or "comprising," when used in this specification, specify the presence of stated elements and/or components, but do not preclude the presence or addition of one or more elements and/or components thereof. As used herein, the term "module" refers to a unit that can perform at least one function or operation and may be implemented utilizing any form of hardware, software, or a combination thereof.

FIG. 1 is a diagram illustrating a battery module 100 in accordance with one or more exemplary embodiments. Particularly, FIG. 1 contains a battery module 100 that includes a solid state driver 110, a cell stack array 140, a first solid state switch 120, a second solid state switch 130, and positive module terminal 150, and a negative module terminal 160. The solid state driver 110 is connected to at least the gates of both the first solid state switch 120 and the second solid state switch 130. The solid state driver 110 is therefore able to drive both switches between their respective on and off positions. Further, the source of first solid state switch 120 is connected to the drain of the second solid state switch 130. Additionally, both the source of first solid state switch 120 and the drain of the second solid state switch 130 are connected to the positive module terminal 150. The drain of the first solid state switch 120 is connected to the positive lead of the cell stack array 140 while the source of the second solid state switch 130 is connected to the negative lead of the cell stack array 140 and the negative module terminal 160.

Accordingly, when the first solid state switch 120 is in an on-state and the second solid state switch 130 is in an off-state, as controlled by the solid state driver 110, the cell stack array 140 of the battery module is engaged and connected through the positive module terminal 150 and the negative module terminal 160. Alternatively, when the first solid state switch 120 is in an off-state and the second solid state switch 130 is in an on-state, as controlled by the solid state driver 110, the cell stack array 140 of the battery module is effectively disengaged and bypassed by allowing the positive module terminal 150 and the negative module terminal 160 to be connected through the second solid state switch 130 which is in an on-state.

Figure 2:
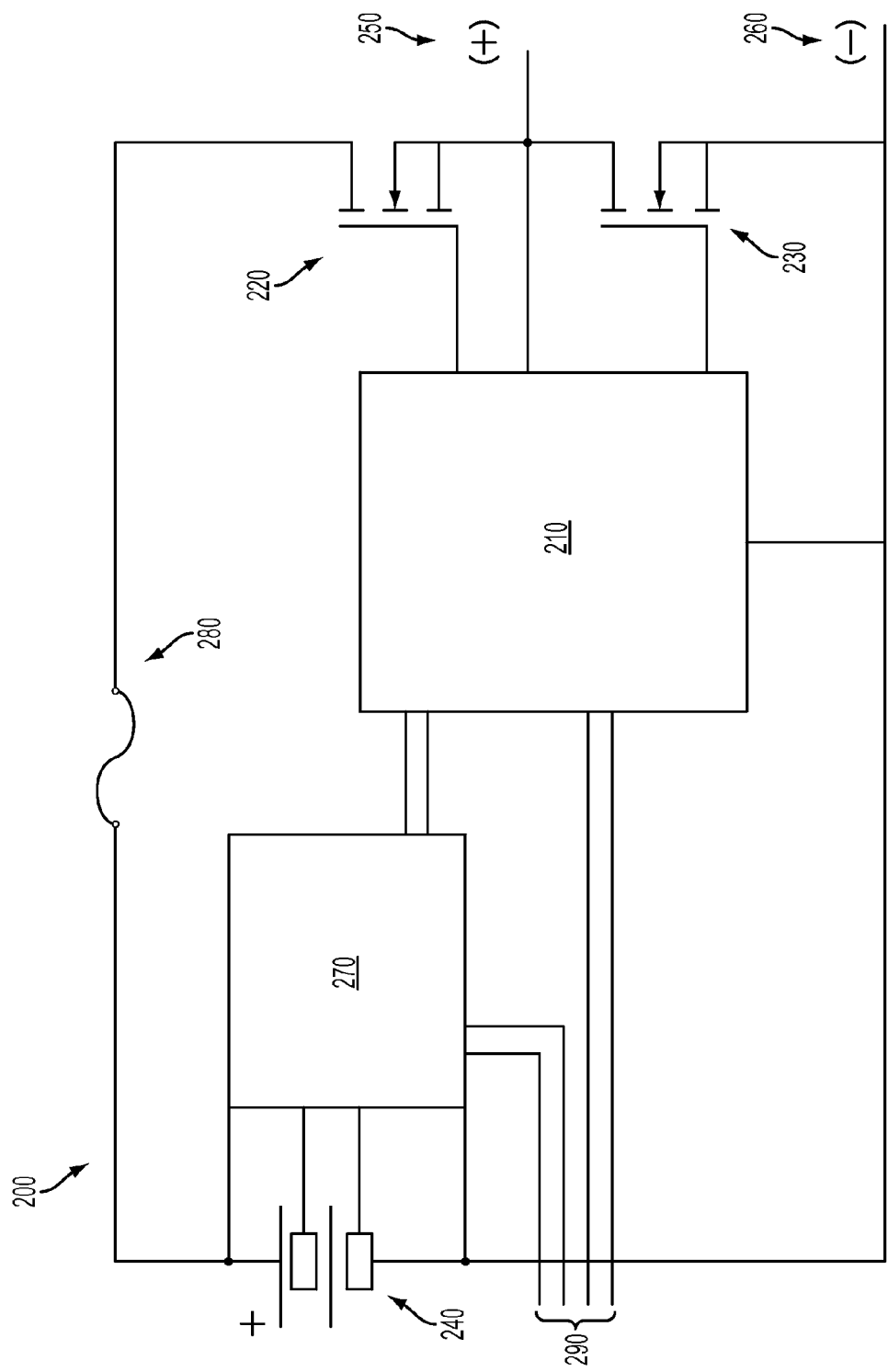
FIG. 2 is a diagram illustrating a battery module in accordance with one or more exemplary embodiments.

FIG. 2 is a diagram illustrating a battery module 200 in accordance with one or more exemplary embodiments. Particularly, FIG. 2 contains a battery module 200 that includes a solid state driver 210, a cell stack array 240, a first solid state switch 220, a second solid state switch 230, and positive module terminal 250, a negative module terminal 260, a cell monitoring and balancing module 270, which is also known generally as a control module 270, a fuse 280, and input/output lines 290. The fuse 280 is connected between the positive lead of the cell stack array 240 and the drain of the first solid state switch 220. The solid state driver 210 is connected to at least the gates of both the first solid state switch 220 and the second solid state switch 230. The solid state driver 210 is therefore able to drive both switches between their respective on and off positions. Additionally, the solid state driver 210 is also connected to the positive module terminal 250, the negative module terminal 260, the cell monitoring and balancing module 270, and the input/output lines 290. This allows the solid state driver 210 to both receive and provide information and control signals from the cell monitoring and balancing module 270 as well as from a source outside the battery module 200.

Further, the source of first solid state switch 220 is connected to the drain of the second solid state switch 230. Additionally, both the source of first solid state switch 220 and the drain of the second solid state switch 230 are connected to the positive module terminal 250. The drain of the first solid state switch 220 is connected to the positive lead of the cell stack array 240 while the source of the second solid state switch 230 is connected to the negative lead of the cell stack array 240 and the negative module terminal 260. Further, the cell monitoring and balancing module 270 is connected to the input/output lines 290, the positive and negative leads of the cell stack array 240, as well as being connected directly to the cell stack array 240.

Accordingly, when the first solid state switch 220 is in an on-state and the second solid state switch 230 is in an off-state, as controlled by the solid state driver 210, the cell stack array 240 of the battery module is engaged and connected through the positive module terminal 250 and the negative module terminal 260. Alternatively, when the first solid state switch 220 is in an off-state and the second solid state switch 230 is in an on-state, as controlled by the solid state driver 210 and the cell monitoring and balancing module 270 and any control signal that are input on the input/output lines 290, the cell stack array 240 of the battery module is effectively disengaged and bypassed by allowing the positive module terminal 250 and the negative module terminal 260 to be connected through the second solid state switch 230 which is in an on-state.

According to an exemplary embodiment, the cell monitoring and balancing module performs cell balancing which is unrelated to the solid state driver. The cell monitoring and balancing module may contain Built-In-Test (BIT) circuitry to determine if the module is ready for safe operation, and is in communication with a central battery controller. This ready state may be indicated by a ready signal from the cell monitoring and balancing module which indicates the enablement of the active state. As such it can verify that the local module is apparently ready for safe operation and further verify that the central controller has sent the appropriate commands to enable the solid state driver. Both of these checks are made on a fairly slow basis (on the order of seconds). The cell monitoring and balancing module may not be aware of battery current on a real time basis. Current measurements need to have a direct real time interface to the PWM controller wherever it is located. This can be implemented in the module or at the central controller, but the PWM control functions, wherever they are distributed, control the operation in real time on a fast basis (microseconds or less).

Figure 3:
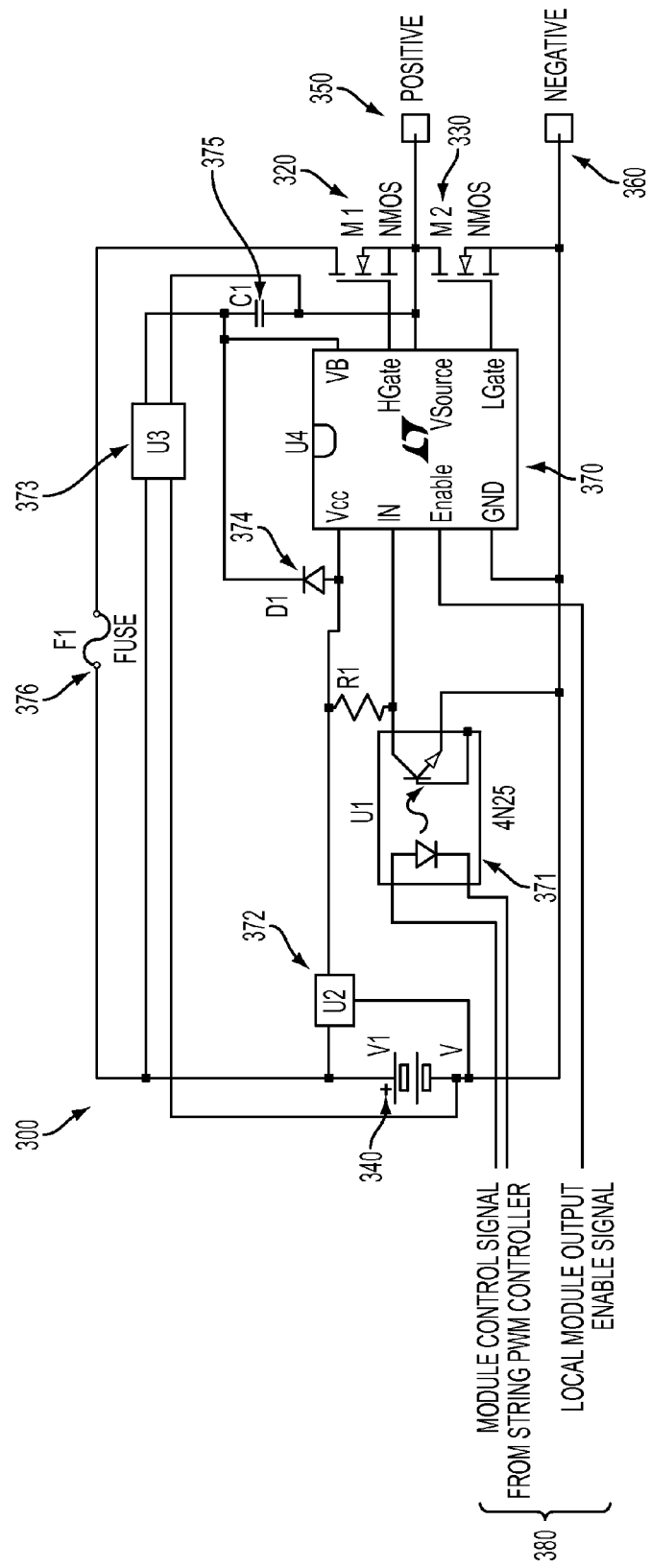
FIG. 3 a diagram illustrating a battery module in accordance with one or more exemplary embodiments.

FIG. 3 is a diagram illustrating a battery module in accordance with one or more exemplary embodiments. According to an exemplary embodiment, a phase-leg pair of solid state switches 320, 330 may be added to each battery module 300 in a string composed of several battery modules in series. The switches 320, 330 are connected to the module cell array 340 and the module output terminals 350, 360 providing for operation in one of two states, either the active state, which is when the module 300 is working in series, or the bypassed state, which is when the cells 340 in the module 300 are disconnected, the string current is bypassed, and the module output terminals 350, 360 are shorted.

Particularly, as shown in FIG. 3, a pair of solid state switches 320, 330 may be added to each module 300 in a battery composed of several modules in series. Taking n-channel FETs as an example type of switch, the drain of the upper FET, M1, 320 is connected to the most positive connection in the module cell stack 340 and the source to the module's positive output terminal 350, while the drain of the lower FET, M2, 330 is connected to the same positive output terminal 350 and the source to the module's negative output terminal 360. The most negative connection in the module cell stack 340 is also connected directly to the negative output terminal 360. M1 320 is driven to the logical compliment of M2 330, including a turn-off delay in each direction. The module 300 is active whenever the upper FET, M1, 320 is on and the lower FET, M2, 330 is off. When the FETs 320, 330 are in the other state, i.e., the upper FET, M1, 320 is off and the lower FET, M2, 330 is on, the cells 340 in the module 300 are disconnected from the other modules in the string and also from the load. The lower FET, M2, 330 carries current past the module 300, allowing other non-bypassed modules in the string to function normally. The gate drive circuit 370 is arranged so that in the base state (also applicable while monitoring electronics are inactive during shipment and storage), the module's output terminals are shorted by the lower FET, M2, 320. According to an exemplary embodiment, the FETs, M1, 320 and M2, 330 may each be implemented as arrays of any number of parallel FETs as needed to provide the required current carrying capability and low conduction resistance.

A suitable IC such as U4 370 in FIG. 3 is used to drive the FET pair 320, 330. The solid state driver 370 may also include a gate driver and a pulse width modulation controller. The FET driver, U4, 370 may consume little power in the base state, such power provided by a power supply, U2, 372 powered by the cells 340 of the module, where power supply, U2, 372 may be of a type with low quiescent current. The cell stack array 340 may be an energy storage element that includes a series string of cells, where the energy storage element includes at least one of an electrochemical cell and an electrolytic capacitor cell. The power supply 372 may be a low side gate drive power supply. Suitable isolator or isolation means such as the optoisolator, U1, 371 may be used to isolate the module control signal from the string PWM controller. According to an exemplary embodiment, a local module cell monitoring and balancing electronics (not shown) may be provided for generating an enable signal to the FET driver, U4, 370 so that the module output will have a redundant control means thus improving safety. According to an exemplary embodiment, diode, D1, 374 and capacitor, C1, 375 may be provided to form a bootstrap power supply to power the high side supply VB of FET driver U4 370. Diode D1 374 allows C1 375 to charge in the base state and recharges C1 375 on each switching cycle unless the duty cycle approaches 100%. According to another exemplary embodiment, power supply U3 373 may be provided to power the high side supply at duty cycles near 100%, while not being required to operate in the base state during shipment and storage. If module operation at 100% duty cycle is not required, the power supply U3 373 may not be required. The power supply, U3, 373 may be any of several types including a charge pump or isolated supply. The power supply 373 may be a high side gate drive power supply.

According to an exemplary embodiment, a base state of a battery module may be when the battery module is bypassed. Further, a high usage state may be when the battery module is usage is at a 100 percent duty cycle, and a variable output state is when the battery module is more than zero percent duty cycle and less than 100 percent duty cycle.

Additionally a fuse 376 may be included as well. Thus, according to one or more exemplary embodiments, application of the switches and overcurrent protection (fuse) to each module will increase module cost but will result in batteries that can be safely assembled and maintained without the risk of high voltage exposure. The modules will be dead-faced (no voltage present on output terminals unless activated by electronic command). The battery will be dead-faced as well. The modules thus equipped will survive overcharge (by bypassing) and short circuit (through the fuse). Battery level fuses or circuit breakers could potentially be eliminated. If a module fuse blows, battery operation can continue using the remaining modules. Further, inputs and outputs 380 may also be provided which may carry a module control signal from a string PWM controller and an output enable signal from the local module.

Figure 4:
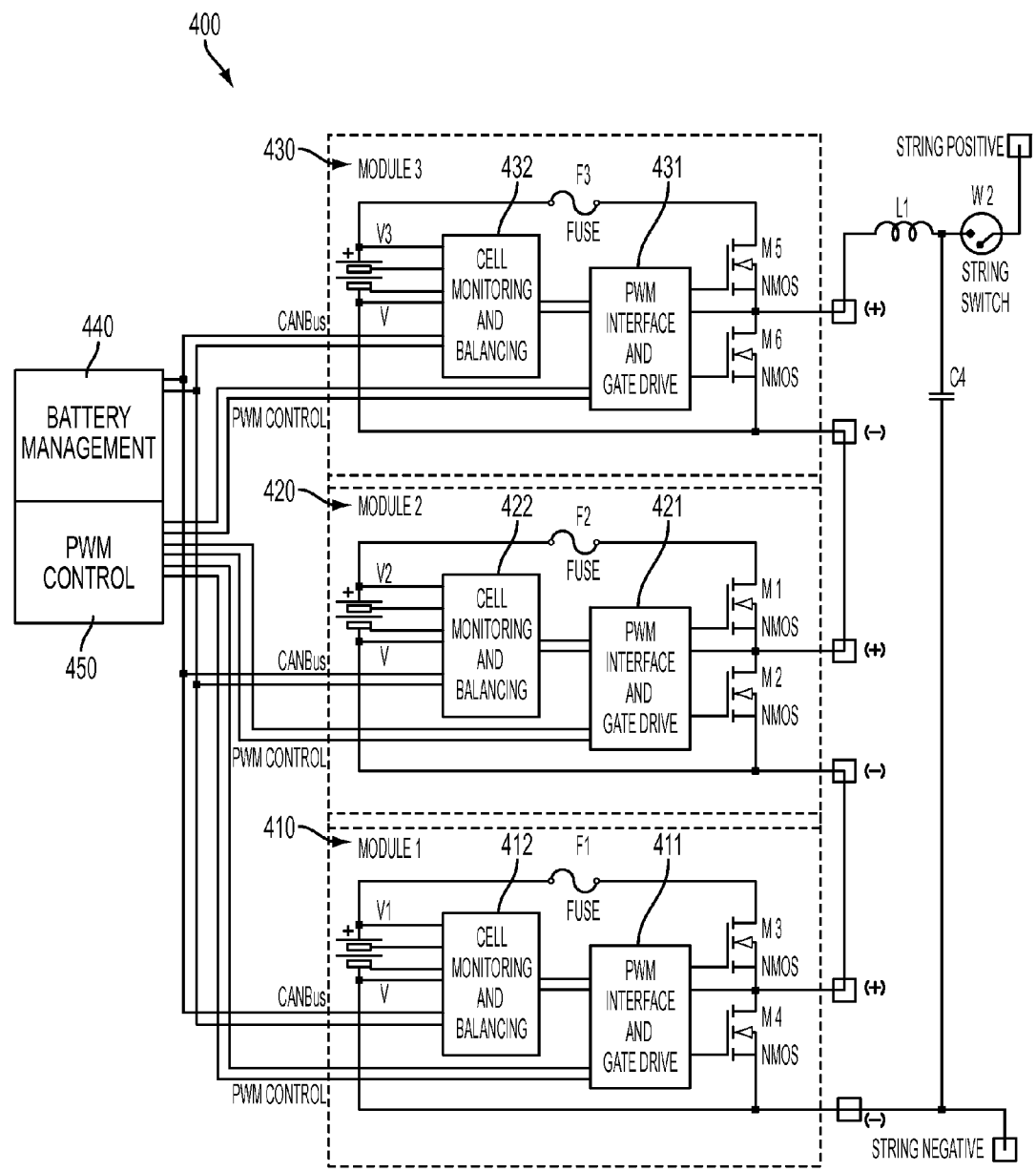
FIG. 4 a diagram illustrating a battery module system that includes a plurality of battery modules in accordance with one or more exemplary embodiments.

FIG. 4 a diagram illustrating a battery module system 400 that includes a plurality of battery modules 410-430 in accordance with one or more exemplary embodiments. Particularly, FIG. 4 shows an exemplary embodiment of a three-module 410-430 battery system 400. Each module 410-430 may contain corresponding PWM interface and Gate Drive modules 411-431, respectively. Additionally, each module 410-430 may contain corresponding Cell Monitoring and Balancing modules 412-432, respectively. The system 400 may also contain a battery management module 440 and a PWM control module 450. Alternatively, according to another exemplary embodiment, these elements may be integrated into each module individually.

Particularly, according to one or more exemplary embodiments, the location of the control function may be internally located within each module, exist outside the modules, or some combination thereof. Specifically, the control functionality may be included in all the PWM logic at the central battery controller and run an individual control line to each module which would act as a slave if BIT checks are acceptable. Another embodiment would be to distribute the control function to each module and engineer the system so each module includes a PWM controller and calculates its own duty cycle based on information sensed by it or transmitted to it, and coordination among modules is achieved by passing timing pulses to the next module in the string. A third embodiment may include a hybrid arrangement where a central controller may determine the duty cycle but coordination and PWM control is handled by the individual modules as described above. Other variations between the extremes of fully distributed or fully centralized control as could be imagined by those skilled.

Higher voltage systems may involve the addition of modules to reach the required voltage. Each module 410-430 may contain a series string of cells V1-V3, a fuse F1-F3 in the positive power path, and a pair of MOSFETs M1-M6 arranged in a half-bridge configuration. The MOSFETs in the half-bridge are normally operated in a complementary fashion. When the high side FET is on, the low side FET is off. In this condition, the module is active, namely, the cell stack voltage appears at the module output terminals. Discharge current flowing through the module passes from the negative module terminal, through the negative power path to most-negative connection of the cells, through the cells, through the fuse, and through the high side FET to the output terminal.

Alternatively, when the high side FET is off, the low side FET is on. In this condition, the module is bypassed, namely, no voltage appears at the module output terminals. Discharge current flows from the negative module terminal through the low side FET, directly to the positive module terminal. Thus, the cells are disconnected from the power path by the high side FET that is turned off, and are not discharged, even if current flows from the negative module terminal to the positive module terminal.

The MOSFET half-bridge may be bidirectional, providing charge current flow similar to that description above. Active modules are charged by system current in the charge direction, while bypassed modules are not.

According to an exemplary embodiment, each module may thus be activated (engaged) or bypassed, as required, at a suitably high switching frequency. The battery voltage is controlled by varying the duty cycle, which is the fraction of time during the switching cycle that modules are engaged. At very low duty cycles, only a single module in the string would be switched on at any one time, while at 100% duty cycle, all modules in the string would be switched on. At intermediate duty cycles, the number of modules switched on at any one time would vary between the two extremes.

According to another exemplary embodiment, a self-regulating battery system may include Li-ion battery modules with integrated power electronics controlled to rapidly switch between engaging and bypassing the cells in the module, in combination with capacitive energy storage at the string (output) level. Each battery module may include power MOSFETs to switch between active and bypassed modes at frequencies on the order of 20 kHz, comprising what amount to the switching elements of a step down converter that are integrated with, and distributed across, the series string of modules that make up the battery. The capacitive energy storage, isolated from the series string of modules by a filter inductor, may provide the energy source required to respond to fast load transients that occur between switching events.

Further, according to another exemplary embodiment, a distributed battery management system (BMS) consisting of module-based cell monitoring and balancing electronics and a central battery management controller may perform the classic functions of State Of Charge (SOC) monitoring, cell balancing, Built-In-Test (BIT), overcharge detection and protection, and control of one or more disconnecting contactors. Sensors for string voltage and current, as well as optional sensors for ground fault, leak and gas detection could be applied as well in accordance with an exemplary embodiment.

According to another exemplary embodiment, in addition to the classic battery control functions, voltage regulation and current limiting control functions are performed by a central Pulse Width Modulation (PWM) controller and implemented by module-based electronics for the PWM interface and gate drive. The PWM controller has a separate channel with a direct interface to each module. When the module monitoring electronics pass BIT and allow operation, activation of the control channel causes the module to engage. The PWM controller switches the modules in an interleaved fashion so the voltage ripple prior the filter inductor is limited to the voltage of one module.

For example, a 300 volt string consisting of six modules of 50 volts each, when operating at a system output of 225 volts, may be constantly switched between 4 and 5 active modules. The voltage before the filter inductor would oscillate between 200V and 250V at a 50% duty cycle. This may be accomplished by switching each module on a 75% duty cycle at 20 kHz, with the phase of each successive module delayed by 60°. While each individual module would be switching at 20 kHz, the phases would be offset such that the ripple frequency would occur at 120 kHz. By offsetting the phase angle for each module, reasonably low switching frequencies can be used at the modules, with the resultant improvement in EMI, while still providing low ripple voltage and high ripple frequencies to minimize the filtering task.

According to an exemplary embodiment, the PWM controller's primary sensor inputs may be high bandwidth voltage and current sensors. Additional sensor data, including temperature data and calculated cell State of Charge (SOC), may be provided by the BMS. The BMS may also serve as the control interface for the PWM controller, where changes to operating states and modes are determined based on Built-In-Test (BIT) results and communications with the host device.

According to an exemplary embodiment, FIG. 4 shows an example of a three-module string of modules 410-430 similar to the module described in FIG. 3. The FET pair of each module may only switch that module's voltage, but a string of modules so equipped can control the battery output. Particularly, one operational mode is to control the string output voltage to a desired setpoint. During this Controlled Output Voltage operating mode, the number of active modules in a string is set to the number required to reach the desired output voltage. The number of active modules will in general comprise two parts, first an integer number of modules required to nearly reach the desired output voltage, and second a fraction of a module required for the remainder of the desired output voltage. During operation, a PWM controller dedicated to controlling the string operates within its base operating frequency to maintain the correct fraction of modules in the "on" state.

Figure 6:
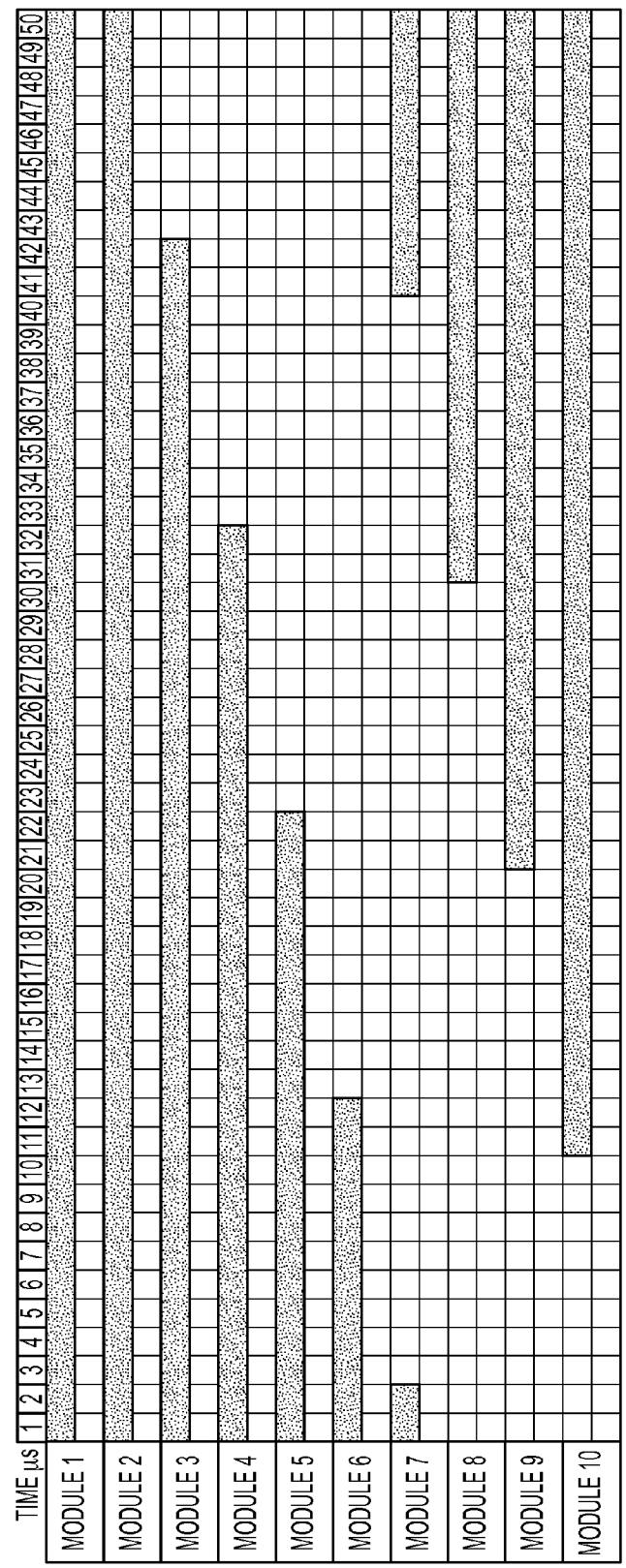
FIG. 6 is a timing chart illustrating a use timing of a battery module system that includes a plurality of battery modules in accordance with one or more exemplary embodiments.

For an example of 100 kHz basic operating frequency, according to an exemplary embodiment, a 10-module string of 50V modules, and a 310V desired output voltage, the number of modules required to be active is 6.2. (6.2*50V=310V) An example of a control algorithm is to perform the following for a 10 µs period: designate modules 1 through 6 as active, module 7 as fractional at 20%, and modules 8 through 10 as bypassed. During the initial 10 µs period, modules 1-6 remain active, module 7 switches from the active state to the bypassed state after 2 µs, and modules 8-10 remain bypassed. During the next 10 µs period, module assignments are rotated such that modules 10 and 1-5 are designated as active, module 6 as fractional at 20% and modules 7-9 remain bypassed. Module 6 is switched from the active state to the bypassed state at 2 µs into the second 10 µs period. Assignments are rotated each successive 10 µs period finally repeating the original sequence after 100 µs. A timing diagram is depicted in FIG. 6.

All power may be removed from the string by placing every module in the bypassed state, although operation in a system with several strings connected in parallel or where another source powers the bus requires an additional string-level switching device to prevent shorting through the string of bypassed modules. A fuse, F1 in FIG. 1, or circuit breaker rated at the module voltage may be inserted between the module switches and the cell stack, preferably in the positive leg.

According to an exemplary embodiment, failures at the module level may be compensated by skipping the failed module, i.e., by assigning the failed module a permanent bypass condition and operating the control algorithm for that string on the basis of one less module. In the example given above, obtaining the 310 V output from 9 functioning modules calls for 1 failed module bypassed at all times, 6 modules active for 100% of each 10 µs period, one module switched from active to bypass at 2 µs, and the remaining two modules bypassed for the 10 µs period.

According to an exemplary embodiment, overcurrent protection fuses F1-F3 may be installed in the modules which are inherently protected from string discharge current by the body gate diodes in the lower FETs M2, M4, and M6, and thus are not required to be rated for the string voltage.

Further, control algorithms may be executed by the PWM controller on the basis of string voltage and/or current, to adjust the duty cycle of the module string to maintain desired output. During a Controlled Output Voltage operating mode, this would increase the overall duty cycle during heavy loads or at low SOC to maintain output voltage at the desired setpoint. Likewise, the overall duty cycle would be decreased during charging to prevent the battery output voltage from increasing. It can be seen that the PWM controller in this mode would continually adjust the overall duty cycle to maintain the output voltage at the desired setpoint.

A useful modification of the Controlled Output Voltage operating mode would add a maximum current limit, which may operate as automatically resetting short circuit protection. Optional behaviors that may be implemented include reducing output voltage while maintaining current at the limiting value (typical operation of a lab power supply), or turning off the output power for a pre-programmed time period and then re-starting the output. If needed, the output may be turned on gradually by ramping up the duty cycle, again precharging any bus capacitance and allowing the system to verify that the fault has been cleared.

In a Controlled Current operating mode, the PWM controller would vary the duty cycle to maintain a desired output current. This could be implemented with cycle-by-cycle current mode control if required for critical applications such as driving solid state laser stacks, but otherwise by modulating the output voltage setpoint so that the desired current is obtained.

Because the switches are applied at the module level, switching components appropriate to the module voltage are preferably used. Module voltages of 60V or less allow the use of switches such as FETs with desirable characteristics such as low gate charge and low conduction resistance, that are capable of being switched at relatively high frequency rather than the relatively low switching frequency required for switching higher voltages where IGBTs are required. IGBTs additionally incur additional conduction losses.

Arranging the FET driver U4 in FIG. 3 so that the lower FET, M2, is "on" in the default state, even when cell monitoring electronics are not active and no PWM controller or CANBus is present, provides modules that will remain in bypassed mode as a baseline state, even when disconnected from a system. In this state, the output terminals are shorted together and are disconnected from the cells. The modules are thus dead faced and safe for handling and transport. To great advantage, the battery system may be assembled and maintained with the modules bypassed without exposing personnel to hazardous voltages. Only when the modules are connected to the BMS, proper communications have been established, BIT (Built-In-Test) results are satisfactory, and the PWM controller begins commanding modules to the active state, will the output voltage increase to the required hazardous level. The preferable feature of requiring both a PWM control signal and an enable signal from the cell monitoring and balancing electronics reduces the likelihood that the module output would be enabled in error.

Control algorithms may adjust the balance of the SOC of an individual module with respect to the rest of the modules in the string. For example, if a module has been replaced during a maintenance action and the replacement module is at a lower SOC, the module may be bypassed during discharge until its SOC reaches a level similar to that of the other modules in the string.

Control algorithms may adjust the SOC of one string with respect to other strings in a parallel array. By operating to a different output voltage setpoint in Controlled Output Voltage operating mode or with a non-proportional current in Controlled Current operating mode, the SOC of one string may be manipulated as required for various purposes. One such purpose would be to enable module balancing as proposed above. Another would be to allow purposeful variation of SOC of a string to enable SOC recalibration or to assist in cell balancing for those electrochemical couples with a flat OCV curve such as lithium-iron phosphate. It is possible to vary the SOCs of several strings in a battery even while the battery is idle with respect to its output terminals. One string may be charged while others are discharged. Each string may be calibrated and balanced in turn. If the battery contains sufficient extra power and energy, this can be accomplished during operation without user intervention or awareness.

Algorithms for imposing current sharing among parallel strings for electrochemical couples with flat voltage curves such as lithium-iron phosphate may introduce a simulated OCV versus SOC curve, for example 410 V at 100% SOC and 330 V at 0% SOC in a modification of the example given above. The simulated OCV/SOC curve may be to a tighter window, for example 410 V at full SOC and 390 V at 0%. The control algorithm would be arranged to determine the output voltage setpoint within the range above based on the calculated string SOC. Parallel strings running the same control algorithm in their PWM controllers would thus automatically share current similar to the way parallel strings of NCA lithium ion cells share current.

Control algorithms may alternately add or subtract a simulated resistance to each string to balance the effects of resistance imbalance between parallel strings that otherwise would lead to imbalanced current sharing.

Control algorithms in each parallel string may alternately operate in Current Control operating mode to a setpoint calculated based on an even share of the total battery current. This setpoint could be further adjusted to make up for differences in SOC between the string and the average of the other strings.

Regardless of the operating mode desired, initial turn-on of the battery output may be accomplished by gradually increasing the overall duty cycle up to the desired level. This will provide a soft-start feature that will inherently control inrush current into capacitive loads. If desired for the application, shutdown may be accomplished in the reverse manner by decreasing overall duty cycle to zero, discharging bus capacitance and placing the energy from the bus capacitance back into the battery.

Figure 5:
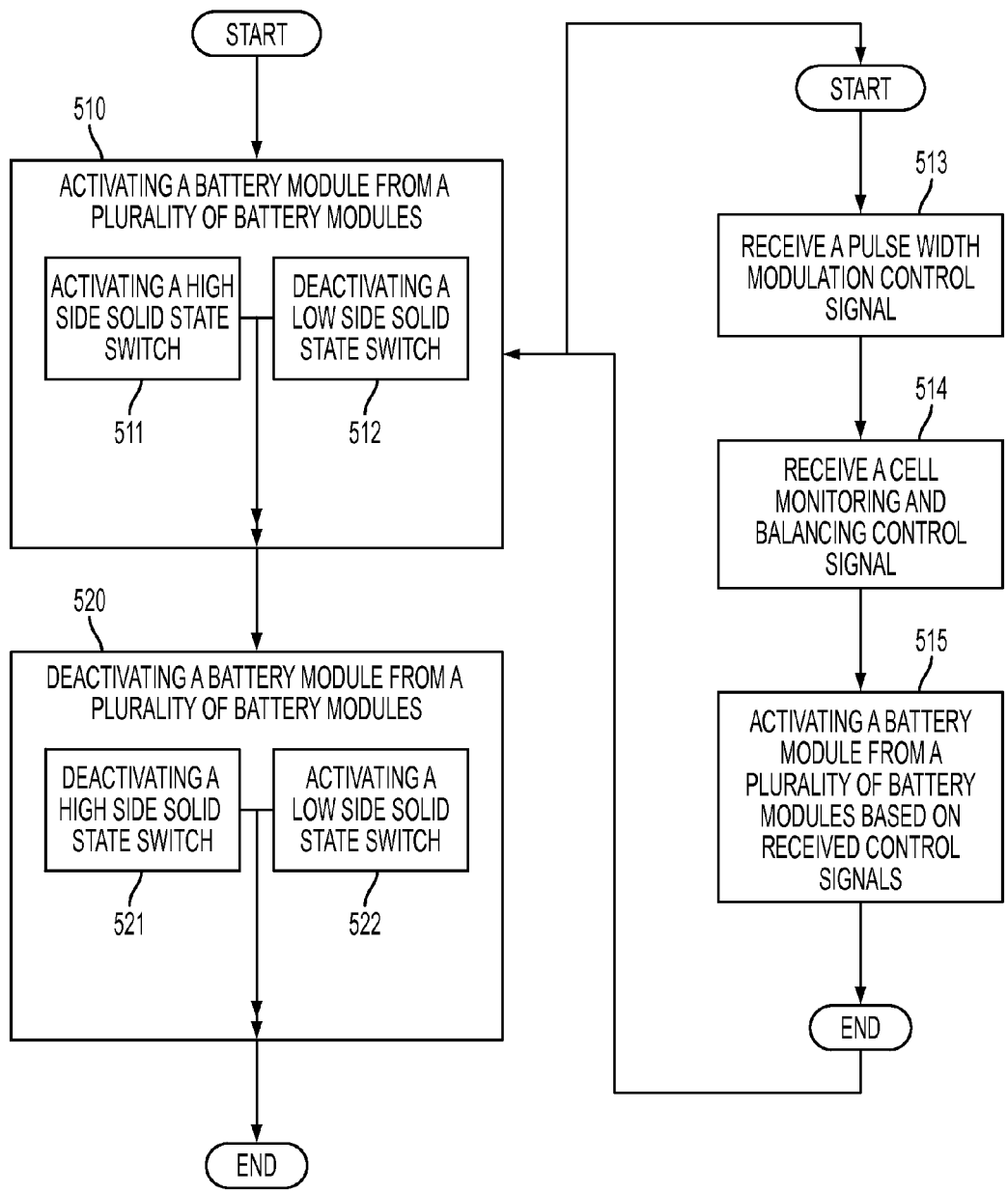
FIG. 5 is a flowchart illustrating a method for using a battery module in accordance with one or more exemplary embodiments.

FIG. 5 is a flowchart illustrating a method for using a battery module in accordance with one or more exemplary embodiments. Particularly, a battery module from a plurality of battery modules is activated 510. This is specifically done by activating a high side solid state switch 511 and correspondingly deactivating a low side solid state switch 512. Further this particular activation 510 may further include receiving a pulse width modulation control signal 513 as well as possibly receiving a cell monitoring and balancing signal 514. Alternatively, according to another embodiment, other control signals from other sources may also be provided to indicate and trigger the activation 510. Further, activation of the battery module is done based on the received control signals 515.

Further, the method also includes deactivating a battery module from a plurality of battery modules 520. This specifically accomplished by deactivating a high side solid state switch 521 and activating a low side solid state switch 522.

FIG. 6 is a timing chart illustrating a use timing of a battery module system that includes a plurality of battery modules in accordance with one or more exemplary embodiments. Particularly, according to an exemplary embodiment, FIG. 6 shows a timing diagram for a 62% Duty Cycle at 100 kHz with the dark grey shaded portions showing active module time and un-shaded portions showing bypassed module time. As shown, modules 1 and 2 are in an active state for the entirety of the run cycle. In contrast, modules 3-7 being in an active state but are transitions to a bypassed state after a certain amount of time has passed, each being bypassed after a shorter time period has passed. Further, modules 8-10 start in the bypassed stated and are transitioned to the active state after a certain period of time as shown in FIG. 6.

According to an exemplary embodiment, individual modules may be commanded between active and bypassed states from a central PWM (Pulsed Width Modulation) control module or from an internal source within each module individually. The central PWM controller may interleave the PWM phase angle for each module in the series string such that the filtering task will function at the product of the number of modules and the base PWM frequency. For instance, a 6-module string with individual modules operating at 20 kHz will have a 120 kHz ripple that requires filtering. As a result of the increased frequency, the inductance and capacitance required for the filter will be reduced. As a further result of interleaving, the ripple voltage is reduced to that of a single module, reducing the performance requirements for the capacitive and inductive elements of the filter.

In addition, and in accordance with another exemplary embodiment, because discharge current may bypass a module through the body gate diodes of the low side MOSFET array, a fuse may be incorporated in each module. The fuse would provide a second means of overload protection, redundant to system level current control. The fuse prevents overloads from causing cell failure, providing protection that will always operate, even at the level of modules before the battery is assembled.

According to an exemplary embodiment, a battery system comprised of bypassable modules may be configured to operate as a step down converter integrated with a battery, and additional modules may be installed to provide N+1 redundancy. The duty cycle to maintain a given output voltage will be reduced under normal circumstances, but when a module failure occurs, the failed module is permanently bypassed and the remaining modules increase their duty cycle to maintain output voltage within the required range.

While operating normally in an N+1 system, the additional module reduces the average load and depth of discharge for all the modules in the system. This will decrease cycle-related degradation by the same fraction. This improves the economic justification of installing the redundant module as there is a life-cycle-cost benefit to adding the extra module, whether it is ever required due to a module failure, or not.

Further, according to another exemplary embodiment, the body gate diodes in the low side MOSFET array may provide an inherent path to bypass the module for current flowing in the discharge direction even if active control of the module is lost. During control failure of an individual module, system discharge current continues to flow through this diode bypass. While the module in question does not contribute power to the load, neither does it interrupt the power of the remaining modules. Thus, an effect resulting from a complete control failure of a single module would be the loss or unintended addition of the module's voltage to the battery. Sustained charge current should be prevented by system or string level controls to prevent overcharge of a module that is not responding to control.

According to another exemplary embodiment, when commanded to engage, the string contactor would be closed and the output voltage ramped up to the setpoint at the desired rate. If the bus is energized before the contactor is closed, the output voltage may be matched to the bus voltage before the contactor is closed, and so large inrush currents are prevented.

Further, according to another exemplary embodiment, the voltage control algorithm may operate to provide a Self-Regulating Battery System (SRBS), acting as a virtual battery with a linear voltage versus SOC curve and tight voltage regulation. This may be accomplished by controlling the output voltage as follows:

Setpoint=250+SOC*30 Vdc

Thus, when the modules in the battery are discharged (SOC=0), the output will be equal to 250V. When the modules are fully charged (SOC=100%), the output will be 280V. At all other States of Charge, the system voltage will be controlled between these two extremes. This provides some of the behavior that is typical of a battery when operating in parallel to a generator, for instance, the Self-Regulating Battery System may source current onto the bus when a load pulls the bus voltage down. Likewise, during a load dump when the generator may briefly continue to source power onto the bus after a load is rapidly removed, the increase in bus voltage will cause the SRBS to sink current from the bus. The SRBS will behave as if it were a battery with little or no impedance, with a linear voltage versus SOC curve and a voltage regulation window of 11% (from 250 to 280 Vdc).

An adjustment to the algorithm above may be to add some amount of virtual charge impedance to the algorithm, such that if charge current is flowing, the SRBS duty cycle is increased to simulate the effect of battery internal resistance, but to do so only when current flows in the charge direction. This would tend to reduce the loads that the SRBS would place on the bus, but not reduce the assistance the SRBS provides to carrying transient loads. Further, when a string of bypassable modules is operating with a virtual voltage versus SOC curve as discussed above, multiple strings may be connected in parallel, sharing loads and charge current without any external coordination. In effect, they may behave as well as NCA Li-ion batteries connected in parallel.

The conduction losses in the parallel MOSFET arrays may be a very low, according to an exemplary embodiment, total of 180 micro-ohms per array. Voltage change in the battery system may be limited to the voltage of one module, about 50V. Filter caps in the battery system may only be required to provide energy during the shorter durations associated with the 120 kHz interleaved switching. The filtering tasks are between 5 and 10 times less challenging as compared to a separate IGBT-based converter.

The SRBS may provide, according to one or more exemplary embodiments, an electrical system performance equivalent to that provided by a separate power converter installed between the battery and the bus. However, the SRBS will provide that functionality without the concentrated power dissipation and substantial volume required by such a power converter. Instead, each module will be somewhat larger and will dissipate more power as a result of the power conversion functions being performed. The Self-Regulating Battery System may be distributed to the advantage of thermal and packaging constraints, and it may provide important safety improvements for shipping, handling, installation, and maintenance because the module terminals will be disconnected and shorted during these activities. The SRBS may provide fuse protection in each module, and may allow for degraded operation after one module failure, where the voltage specifications may be met as long as SOC is maintained at a sufficiently high value. Adding an extra module provides full N+1 redundancy, where a module failure can be tolerated while still meeting all required specifications. The N+1 redundant system will exhibit improved cycling performance, providing an economic benefit to help offset the cost of the additional module.

One or more of the exemplary embodiments may provide the ability to switch each module into or out of a series string, and to do so at a rate fast enough that the variations in voltage can be filtered at the string or battery level. Each series string of modules essentially integrates a distributed step-down converter. Operating strings in this manner can provide a plurality of benefits. For example, the ability to continue battery operation with a failed module by keeping the failed module in bypassed mode; the ability to provide overcurrent protection at the module level, with protection devices rated for only the module voltage; and the ability to control output voltage by operating modules on an overall duty cycle in the range from 0% to 100%. For example, a string with 10 modules each at 56V may operate with 9.11 modules active at any one time (9 modules on at all times and the 10th module on an 11% duty cycle) to provide 510V output from the 560V battery. It may also operate with only 0.0714 modules active (9 modules bypassed at all times with the 10th operating on a 1/14 duty cycle to provide a 4V output from a 560V battery). Equipped with appropriate string-level controls, a string of modules can maintain any lower output voltage, similar to a step-down DC to DC converter. Likewise, the controls may operate to maintain current within proscribed limits or at a constant or controlled value.

Additionally, one or more of the exemplary embodiments may provide the implementation of power switching at the module level so that switching device voltages are limited to the module potential, typically 60 V or less, allowing high switching frequencies with the attendant benefits of small low cost filter components. Further, one or more of the exemplary embodiments may provide the ability to control battery output in any arbitrary manner within the voltage limits of the battery, the current limits of the modules, and the frequency limits of the switches and filters. This includes providing regulated output voltage which can be any desired voltage less than the voltage of the series string, including increments of less than a module's voltage or less than a cell's voltage. This also includes the ability to add to the number of modules in series for purposes of increasing the battery's capacity, which can increase the capacity of the battery by less than the capacity of an additional parallel cell.

Further, other benefits may include allowing for battery shipping, handling, assembly, and maintenance with all modules in the inactive state, such that voltage is not present on the module outputs. Thus, neither protective equipment nor blind mate connectors with physical interlocks would be required. Another benefit may be providing a means to change the balance of SOC between one module and the others in the string by changing the duty cycle of one module relative to the rest of the modules in the string.

One or more of the exemplary embodiments may provide a means to control current in multiple parallel branches. This capability can impose equal balance of current among parallel branches, overcoming resistance and temperature variations. It also may provide a means for periodically purposefully varying the SOC of one string for purposes of SOC calibration or cell balancing, and may provide the capability for soft start of the battery output, eliminating the requirement for separate precharge current limiters. The soft start capability can be standardized and will not require tailoring when load capacitance changes or housekeeping loads are increased.

While exemplary embodiments have been described with respect to a limited number of embodiments, those skilled in the art, having the benefit of this disclosure, will appreciate that other embodiments can be devised which do not depart from the scope as disclosed herein. Accordingly, the scope should be limited only by the attached claims.

What is claimed is:

1. A battery module comprising:
    a cell stack array;
    a first solid state switch and a second solid state switch arranged in a half bridge configuration and configured to operate in a complementary fashion; and
    a solid state driver connected to both gates of the first solid state switch and second solid state switch and configured to turn on and off the first solid state switch and the second solid state switch,
    the cell stack array being configured to be active when the first solid state switch is on and the second solid state switch is off, and configured to be bypassed when the first solid state switch is off and the second solid state switch is on,
    wherein the battery module further comprises:
    a low side gate drive power supply configured to provide power to a gate driver in response to the battery module being in a base state, wherein the low power supply is configured to have low quiescent current and is powered by the cell stack array; and
    a high side gate drive power supply configured to provide power to a gate driver in response to the battery module being in a high usage state, wherein the high side gate drive power supply is configured to be powered by at least one of the cell stack array or the positive terminal of the battery module;
    and wherein the low side gate drive power supply and the high side gate drive power supply are further configured to provide power to the gate driver in response to the battery module being in a variable output state.

2. The battery module of claim 1,
    wherein the cell stack array is an energy storage element comprising a series string of cells,
    wherein the first solid state switch is a high side field-effect transistor (FET), and the second solid state switch is a low side field-effect transistor (FET), and
    wherein the solid state driver comprises a pulse width modulation controller and gate driver.

3. The battery module of claim 1, wherein the battery module is communicatively connected to a control module configured to receive a voltage value and a current value of the cell stack array and determine a control signal that is configured to be transmitted to the solid state driver as an enable signal.

4. The battery module of claim 1, wherein the base state is when the battery module is being bypassed when a usage is at a zero percent duty cycle, wherein the high usage state is when the battery module usage is at a 100 percent duty cycle, and wherein the variable output state is when the battery module is more than zero percent duty cycle and less than 100 percent duty cycle.

5. The battery module of claim 1 comprising:
    a positive module terminal and a negative module terminal;
    wherein the cell stack array comprises a positive lead and a negative lead,
    wherein the first solid state switch comprises a first gate, a first source, and a first drain,
    wherein the second solid state switch comprises a second gate, a second source, and a second drain, and
    wherein the first drain is connected to the positive lead, the first source is connected to the second drain, the first source and the second drain are connected to the positive module terminal and solid state driver, the first gate and the second gate are connected to the solid state driver, and the second source is connected to the negative lead, the negative module terminal, and the solid state driver.

6. The battery module of claim 5, further comprising a cell monitoring and balancing module connected to the solid state driver and cell stack array.

7. The battery module of claim 5, further comprising:
    a low side gate drive power supply connected to a gate driver and the cell stack array; and
    a high side gate drive power supply connected to the gate driver and a power source comprising at least one of the cell stack array and the positive module terminal,
    wherein the gate driver is connected to the first gate, the second gate, the first source, and the second source.

8. The battery module of claim 5, wherein the first solid state switch is a high side field-effect transistor (FET), and wherein the second solid state switch is a low side FET.

9. The battery module of claim 8, wherein the high side FET is comprised of an array of one or more FETs in parallel, and wherein the low side FET is comprised of an array of one or more FETs in parallel.

10. The battery module of claim 5, wherein the solid state driver comprises a gate driver and is communicatively connected to a pulse width modulation controller.

11. The battery module of claim 5, wherein the cell stack array is an energy storage element comprising a series string of cells, wherein the energy storage element comprises at least one of an electrochemical cell and an electrolytic capacitor cell.

12. The battery module of claim 5, further comprising a fuse connected between the positive lead and the first drain.

13. A battery system comprising:
   a plurality of battery modules connected in series, wherein at least one of the plurality of battery modules comprises:
   a cell stack array;
   a first solid state switch and a second solid state switch arranged in a half bridge configuration and configured to operate in a complementary fashion; and
   a solid state driver connected to both gates of the first solid state switch and second solid state switch and configured to turn on and off the first solid state switch and the second solid state switch, and
   the cell stack array being configured to be active when the first solid state switch is on and the second solid state switch is off, and configured to be bypassed when the first solid state switch is off and the second solid state switch is on,
   wherein the battery module further comprises:
   a low side gate drive power supply configured to provide power to a gate driver in response to the battery module being in a base state, wherein the low power supply is configured to have low quiescent current and is powered by the cell stack array; and
   a high side gate drive power supply configured to provide power to a gate driver in response to the battery module being in a high usage state, wherein the high side gate drive power supply is configured to be powered by at least one of the cell stack array or the positive terminal of the battery module;
   and wherein the low side gate drive power supply and the high side gate drive power supply are further configured to provide power to the gate driver in response to the battery module being in a variable output state.

14. The battery system of claim 13, wherein at least one of the plurality of battery module further comprises:
   a control module configured to receive a voltage value and a current value of the cell stack array and determine a control signal that is configured to be transmitted to the solid state driver as an enable signal.

15. The battery system of claim 14, further comprising:
   a battery management module configured to transmit a battery management signal to the control module in response to received data from the control module; and
   a pulse width modulation (PWM) control module configured to transmit a PWM control signal in response to received data from at least one of the control module, the battery management module, sensors or transducers of voltage and/or current, and the solid state driver that comprises a PWM interface and gate drive.

16. A method of controlling a plurality of battery modules, the method comprising:
   controlling a state of a battery module from among the plurality of battery modules,
   wherein the state is at least one from a group consisting of an activated state and a deactivated state,
   wherein the activated state is achieved by activating a high side solid state switch and deactivating a low side solid state switch of the battery module, and
   wherein the deactivated state is achieved by activating the low side solid state switch and deactivating the high side solid state switch of the battery module,
   wherein power is provided to a gate driver in response to the battery module being in a base state, wherein a low side gate drive power supply is configured to have low quiescent current and is powered by a cell stack array; and
   wherein power is provided to a gate driver in response to the battery module being in a high usage state, wherein a high side gate drive power supply is configured to be powered by at least one of the cell stack array or a positive terminal of the battery module;
   and wherein the low side gate drive power supply and the high side gate drive power supply provide power to the gate driver in response to the battery module being in a variable output state.

17. The method of claim 16, further comprises:
   receiving a pulse width modulation (PWM) control signal indicating enablement of the active state;
   receiving a ready signal indicating enablement of the active state; and
   selectively activating the deactivated battery module from among the plurality of battery modules based on the received PWM control signal and the ready signal.

18. The method of claim 16, further comprising:
   generating a PWM control signal based on at least one of a state of charge (SOC) of a battery module in the plurality of battery modules, desired output voltage of the plurality of battery modules, and desired output current of the plurality of battery modules,
   wherein the controlling of the battery module is based on the generated PWM control signal and the enable signal.

19. The method of claim 16, further comprises:
   selectively activating the low side solid state switch and selectively deactivating the high side solid state switch in response to a lacking of a PWM control signal or an enable signal, or in response to receiving the PWM control signal or the enable control signal either of which indicate deactivating the activated battery module from among the plurality of battery modules.

* * * * *

UNITED STATES PATENT AND TRADEMARK OFFICE
CERTIFICATE OF CORRECTION

PATENT NO. : 9,525,290 B2  
APPLICATION NO. : 14/063043  
DATED : December 20, 2016  
INVENTOR(S) : James G. Snyder Page 1 of 1

It is certified that error appears in the above-identified patent and that said Letters Patent is hereby corrected as shown below:

On the Title Page

Assignee (73):
"SAFT, Bagnolet (FR)" has been replaced with --SAFT GROUPE SA, Bagnolet (FR)--

Signed and Sealed this  
Ninth Day of May, 2017

Michelle K. Lee  
*Director of the United States Patent and Trademark Office*